US012775120B2

(12) United States Patent
Gur et al.

(10) Patent No.: US 12,775,120 B2
(45) Date of Patent: Oct. 27, 2026

(54) OPTICAL STRUCTURES THAT INCLUDE AN ANTI-REFLECTIVE COATING ON TAPERED META-ATOMS

(71) Applicant: NIL Technology ApS, Kongens Lyngby (DK)

(72) Inventors: Ugur Meric Gur, Kongens Lyngby (DK); James Eilertsen, Zug (CH)

(73) Assignee: NIL Technology ApS, Kongens Lyngby (DK)

( * ) Notice: Subject to any disclaimer, the term of this patent is extended or adjusted under 35 U.S.C. 154(b) by 174 days.

(21) Appl. No.: 18/857,742

(22) PCT Filed: Apr. 3, 2023

(86) PCT No.: PCT/EP2023/058722

§ 371 (c)(1),
(2) Date: Oct. 17, 2024

(87) PCT Pub. No.: WO2023/202872

PCT Pub. Date: Oct. 26, 2023

(65) Prior Publication Data

US 2025/0264637 A1 Aug. 21, 2025

Related U.S. Application Data

(60) Provisional application No. 63/332,870, filed on Apr. 20, 2022.

(51) Int. Cl.
*G02B 1/00* (2006.01)
*G02B 1/11* (2015.01)

(52) U.S. Cl.
CPC ................ *G02B 1/002* (2013.01); *G02B 1/11* (2013.01)

(58) Field of Classification Search
CPC .................................. G02B 1/002; G02B 1/11
See application file for complete search history.

(56) References Cited

U.S. PATENT DOCUMENTS 11,226,082 B1 1/2022 Lenef et al.
2012/0146044 A1 6/2012 Gmeinwieser et al.
(Continued)

FOREIGN PATENT DOCUMENTS

CN 110716247 A 1/2020
CN 215010478 U 12/2021
(Continued)

OTHER PUBLICATIONS

Berginc, "Periodic or random nanostructures for light scattering control," Applied Physics A, Mar. 8, 2016, 122(4), 10 pages.
(Continued)

*Primary Examiner* — Charles S Chang
(74) *Attorney, Agent, or Firm* — Fish & Richardson P.C.

(57) ABSTRACT

Implementations for optical elements that include tapered meta-atoms are described. An example apparatus includes a substrate, and meta-atoms on the substrate, wherein each of the meta-atoms has a respective top surface and a respective bottom surface, wherein the bottom surface forms an interface with the substrate. The apparatus further includes an anti-reflective coating on the respective top surface of each of the meta-atoms, wherein the top surface forms an interface with the anti-reflective coating. Each of the meta-atoms has one or more tapered sides connecting the top surface of the meta-atom to the bottom surface of the meta-atom.

12 Claims, 4 Drawing Sheets

(56) References Cited

U.S. PATENT DOCUMENTS

| | | | |
|---|---|---|---|
| 2014/0263982 A1 | | 9/2014 | Shkunov et al. |
| 2017/0082263 A1 | | 3/2017 | Byrnes et al. |
| 2019/0044003 A1 | | 2/2019 | Heck et al. |
| 2019/0064532 A1 | | 2/2019 | Riley, Jr. et al. |
| 2019/0139243 A1 | | 5/2019 | You et al. |
| 2019/0302325 A1 | * | 10/2019 | Sorbel .................... G02B 1/111 |
| 2021/0184081 A1 | | 6/2021 | Lopez-Julia et al. |
| 2021/0191231 A1 | | 6/2021 | Hayashi et al. |

FOREIGN PATENT DOCUMENTS

| | | | |
|---|---|---|---|
| EP | 1416303 | A2 | 5/2004 |
| EP | 2368278 | B1 | 3/2014 |
| WO | WO 2020/097319 | A1 | 5/2020 |
| WO | WO 2020/157741 | A1 | 8/2020 |
| WO | WO 2021/226177 | A1 | 11/2021 |

OTHER PUBLICATIONS

International Preliminary Report on Patentability in International Appln. No. PCT/EP2023/058722, mailed on Oct. 8, 2024, 7 pages.

International Search Report and Written Opinion in International Appln. No. PCT/EP2023/058722, mailed on Jul. 14, 2023, 10 pages.

Lin et al., "Analysis of tapered nanopillars for reflective metalens: the role of higher-order modes," IEEE Photonics Journal, Jul. 7, 2020, 12(4):1-8.

* cited by examiner

OPTICAL STRUCTURES THAT INCLUDE AN ANTI-REFLECTIVE COATING ON TAPERED META-ATOMS

CROSS-REFERENCE TO RELATED APPLICATIONS

This application is a National Stage application under 35 U.S.C. § 371 of International Application No. PCT/EP2023/058722, filed on Apr. 3, 2023, which claims the benefit of priority from U.S. Provisional Patent Application No. 63/332,870, filed on Apr. 20, 2022, the contents and disclosures of which are incorporated herein by reference in their entirety.

FIELD OF THE DISCLOSURE

The present disclosure relates to optical structures that include an anti-reflective coating (ARC) on tapered meta-atoms.

BACKGROUND

Metasurfaces have recently emerged as a promising technology to realize flat and ultra-thin optical elements that can manipulate light at sub-wavelength scale. Meta optical elements (MOEs) include a metasurface having a distributed array of meta-atoms (e.g., nanostructures) that are arranged, individually or collectively, to interact with light waves. For example, the nanostructures or other meta-atoms may change a local amplitude, a local phase, or both, of an incoming light wave. In some applications, it is desirable to include an ARC on the surface of the meta-atoms.

SUMMARY

The present disclosure describes optical structures that include meta-atoms having a tapered side and an ARC on their surface.

In one aspect, for example, the present disclosure describes an apparatus that includes a substrate, and a plurality of meta-atoms on the substrate, wherein each of the meta-atoms has a respective top surface and a respective bottom surface, wherein the bottom surface forms an interface with the substrate. The apparatus further includes an anti-reflective coating on the respective top surface of each of the meta-atoms, wherein the top surface forms an interface with the anti-reflective coating. Each of the meta-atoms has one or more tapered sides connecting the top surface of the meta-atom to the bottom surface of the meta-atom, and the top and bottom surfaces of each meta-atom have the same shape as one another and have the same shape as the top and bottom surfaces of the other meta-atoms. The size of an area defined by the top surface of each particular one of the meta-atoms is the same as the size of an area defined by the top surface of each of the other meta-atoms. The size of an area defined by the bottom surface of each particular one of the meta-atoms differs from the size of an area defined by the bottom surface of other ones of the meta-atoms. The meta-atoms have the same height as one another, wherein the height of the meta-atoms provides a phase shift difference of two-pi between light at an operating wavelength passing through a meta-atom having the smallest bottom surface area and light at the operating wavelength passing through the meta-atom having a largest bottom surface area.

Some implementations include one or more of the following features. For example, in some cases, each of the meta-atoms has a truncated cone shape. In some cases, each of the meta-atoms has a frustum shape. In some implementations, a dimension of the top surface of each meta-atom is smaller than a corresponding dimension of the bottom surface of the same meta-atom. In some implementations, the top surface of each particular meta-atom has a diameter that is smaller than a diameter of the bottom surface of the same meta-atom. For example, the diameter of the top surface of each meta-atom is, in some instances, in a range of 50-200 nm. In some cases, there are at least 1,000 meta-atoms in the plurality of meta-atoms, and wherein, collectively, the respective areas of the bottom surfaces of the meta-atoms range among at least sixteen different discrete sizes.

In some implementations, the apparatus includes a meta optical element that includes the plurality of meta-atoms. The meta-atoms can be composed, for example, of at least one of polysilicon, amorphous silicon, crystalline silicon, silicon nitride, zinc oxide, titanium oxide, aluminum zinc oxide, or a niobium oxide. The substrate can be composed, for example, of a material that is transparent to the operating wavelength.

In some implementations, the apparatus further includes a module including an optoelectronic component operable to emit light or sense light. The meta optical element is disposed either (i) to intercept a path of light emitted by the optoelectronic component and to direct the light out of the module, or (ii) to intercept a path of light entering the module and to direct the light to the optoelectronic component.

In accordance with some implementations, an apparatus includes a substrate, and a plurality of tapered meta-atoms on the substrate, wherein each of the meta-atoms has a respective top surface and a respective bottom surface. An anti-reflective coating is present on the respective top surface of each of the meta-atoms. The top surface of each meta-atom forms a respective first interface with the anti-reflective coating, and the bottom surface of each meta-atom forms a respective second interface with the substrate. The respective first and second interfaces for each meta-atom have the same shape as one another and have the same shape as the respective first and second interfaces for the other meta-atoms. The size of the respective first interface is the same for each of the other meta-atoms, and the size of the respective second interface differs for different one of the meta-atoms. The height of the meta-atoms provides a phase shift difference of two-pi between light at an operating wavelength passing through a meta-atom that forms the smallest second interface with the substrate and light at the operating wavelength passing through a meta-atom that forms the largest second interface with the substrate.

The present disclosure also describes a method of designing and fabricating a MOE having meta-atoms.

In some implementations, the subject matter of this disclosure enables improved optical performance of the MOE.

The details of one or more implementations of the subject matter described in this specification are set forth in the accompanying drawings and the description below. Other aspects, features and advantages will be readily apparent from the description, the accompanying drawings and the claims.

DETAILED DESCRIPTION

Figure 1:
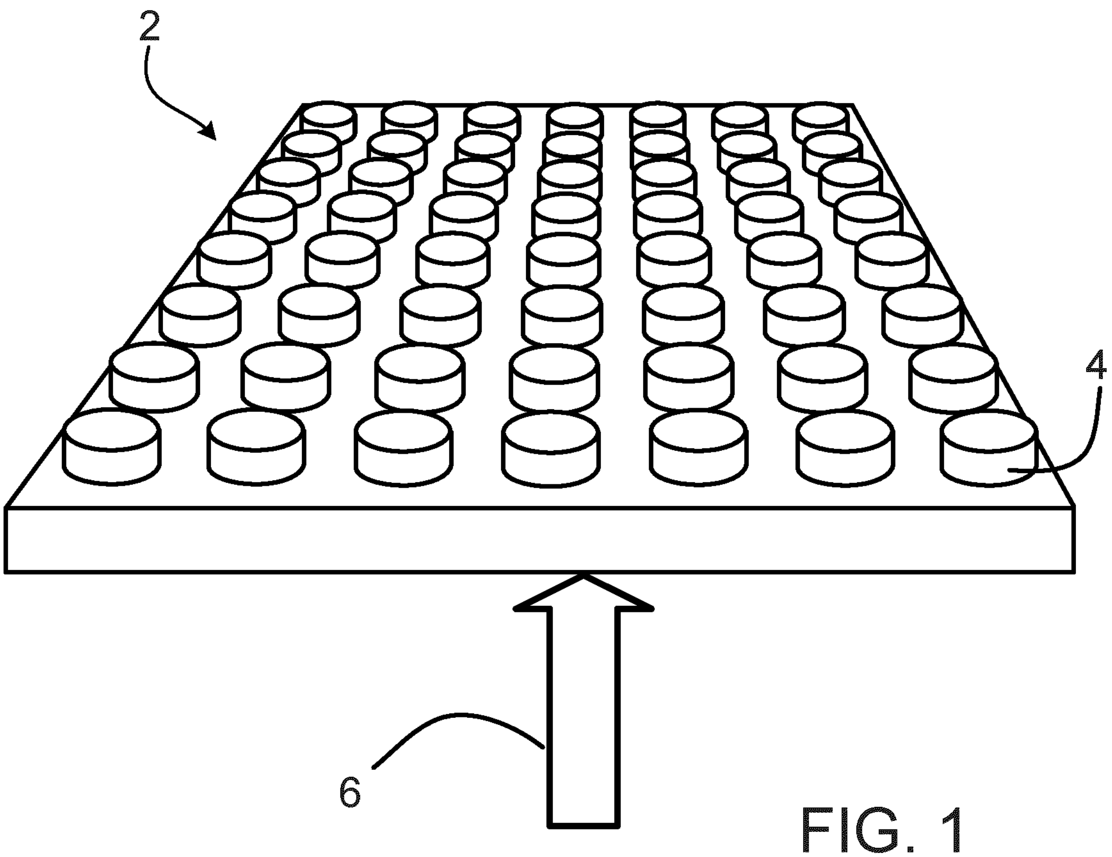
FIG. 1 illustrates an example of a meta optical element (MOE).

FIG. 1 illustrates an example of a MOE 2 that includes a distributed array of meta-atoms 4 arranged to interact with incident light 6. In the illustrated example of FIG. 1, the meta-atoms 4 are pillar-shaped (e.g., cylindrical).

Some MOEs include pillar-shaped meta-atoms having different respective diameters, which guide the electromagnetic radiation (e.g., infra-red light) differently from one another. Meta-atoms having a relatively small diameter (e.g., tens of nanometers) can have an effective refractive index that differs from the refractive index of the bulk material of the meta-atoms. Further, at such small scales, the effective refractive index of meta-atoms varies not only with the material of the meta-atoms and the surrounding cladding material (e.g., air), but with their diameter as well.

In general, the material and thickness for an ARC can be selected according to the effective refractive index of the meta-atom. For example, the thickness ($t_{ARC}$) of the ARC can be expressed as:

$$t_{ARC} = \frac{\lambda}{4 \times \eta_{ARC}},$$

where the refractive index ($\eta_{ARC}$) of the ARC is:

$$\eta_{ARC} = \sqrt{\eta_{Atom} \times \eta_{AIR}},$$

and $\eta_{Atom}$ is the refractive of the cladding material (e.g., air), and $\eta_{Atom}$ is the refractive index of the meta-atom, which is a function of the meta-atom's top diameter (i.e., at the interface with the ARC).

In a typical application, the ARC has substantially the same thickness across the MOE. That is, the thickness of the ARC on meta-atoms having different diameters is substantially the same. As a result, the ARC material and thickness typically are optimal only for meta-atoms having a particular diameter. Such an ARC material and/or thickness may not be optimal for other meta-atoms in the MOE that have different diameters. Such an arrangement can lead to reduced optical performance of the MOE.

Figure 2:
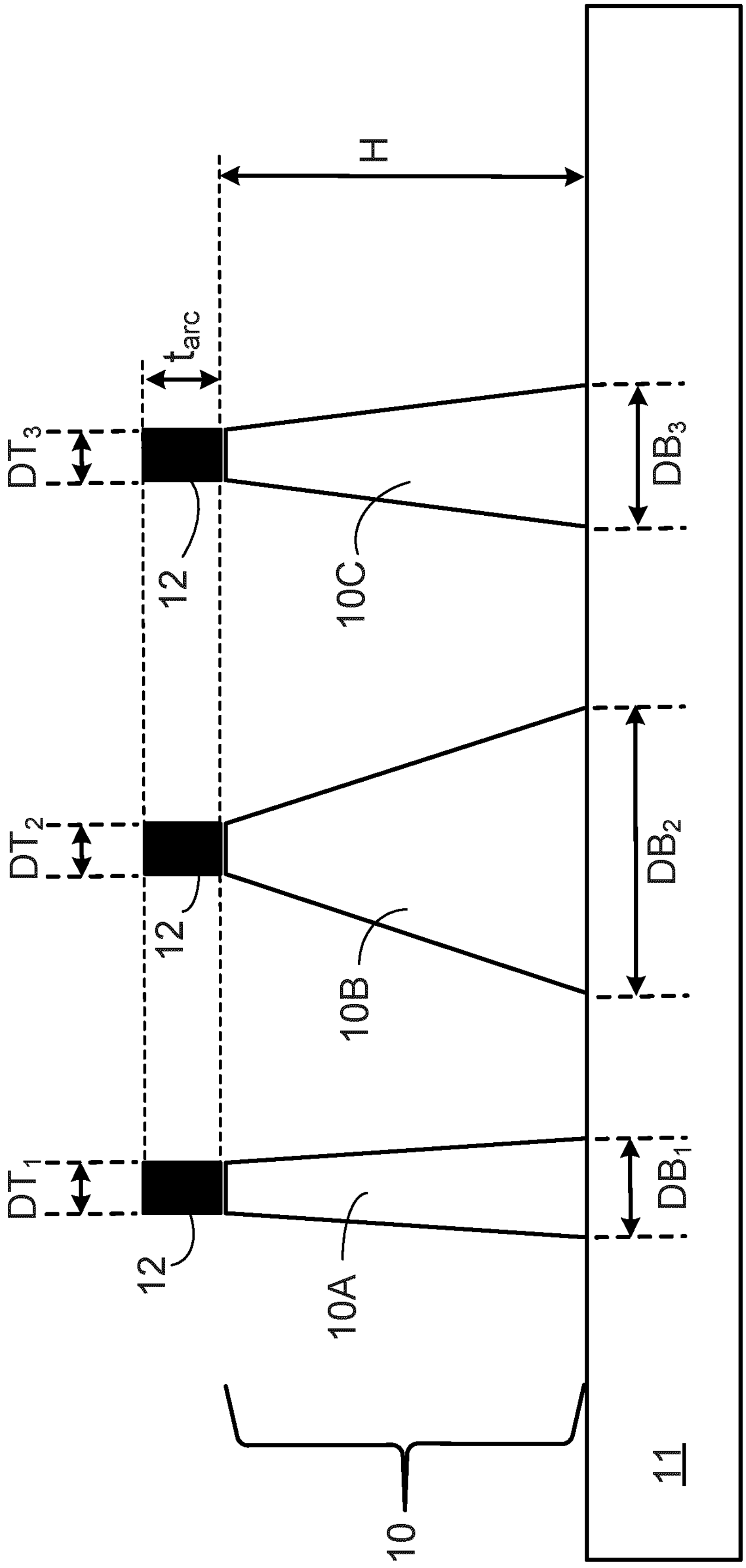
FIG. 2 illustrates an example of meta-atoms in accordance with the present disclosure.

As shown in FIG. 2, in accordance with the present disclosure, a MOE (e.g., a metalens) includes meta-atoms 10A, 10B, 10C (collectively 10) and is designed for operation at particular wavelength (e.g., an operating wavelength in the infra-red or visible range of the electromagnetic spectrum). Although FIG. 1 shows only three meta-atoms, the MOE may have hundreds, thousands, millions, or even hundreds of millions of meta-atoms arranged in a two-dimensional pattern (e.g., array) or other arrangement. The meta-atoms may be composed, for example, of at least one of polysilicon, amorphous silicon, crystalline silicon, silicon nitride, zinc oxide, titanium oxide, aluminum zinc oxide, or a niobium oxide. The meta-atoms can be disposed on a substrate 11 composed, for example, of glass or some other material that is substantially transparent to the operating wavelength.

Each of the meta-atoms 10 can have, for example, a truncated cone-shape such that the sides of each meta-atom are tapered. That is, each meta-atom has a respective top surface and bottom surface such that the top diameter ($DT_x$) of each particular meta-atom is smaller than the bottom diameter ($DB_x$) of the same meta-atom. Further, the top diameter ($DT_x$) of each meta-atom is the substantially the same as that of the other meta-atoms. That is, in FIG. 1, $DT_1=DT_2=DT_3$. Stated another way, the area of the top surface of each meta-atom is substantially the same as that of the other meta-atoms. In contrast, the bottom diameter ($DB_x$) of each meta-atom differs from that of at least one other meta-atom. For example, in FIG. 2, $DB_1/DB_2 \neq DB_3$. In particular, in the illustrated example, $DB_2>DB_3>DB_1$. Although FIG. 2 illustrates meta-atoms collectively having bottom diameters of three different sizes, some implementations include meta-atoms collectively having bottom diameters of at least sixteen different sizes. In some cases, there may be thirty two, or even more, different sizes for the bottom diameters. The height of each of the meta-atoms 10 can be substantially the same.

As further shown in FIG. 2, an ARC 12 is disposed on the top of each meta-atom 10. Examples of the material for the ARC 12 include sputter-coated silicon nitride, or spin-on-glass. Other ARC materials may be used for some implementations. The thickness of the ARC is indicated in FIG. 1 by tare and is the same (or substantially the same) for each of the meta-atoms 10. Further, as the top dimeter ($DB_x$) of each of the meta-atoms is substantially the same, the size of the interface between the ARC 12 and each underlying meta-atom 10 is substantially the same as for the other meta-atoms. That is, the interface between each respective one of the meta-atoms 10 and the ARC 12 has substantially the same diameter.

In accordance with the present disclosure, the bottom diameter ($DB_x$) of each meta-atom can be an optical design parameter. That is, changing the bottom diameter ($DB_x$) of a meta-atom 10 modifies its effective refractive index (i.e., changing the bottom diameter ($DB_x$) of a meta-atom 10 modifies the propagation constant of the fundamental electromagnetic guided mode). For example, increasing the bottom diameter $DB_x$ increases the effective refractive index (or slows down the fundamental electromagnetic guided mode). Therefore, the phase addition (or the speed of the fundamental electromagnetic guided mode) for each of the meta-atoms can be controlled by using a tapered design and selecting an appropriate taper angle for each meta-atom 10. Two-pi ($2\pi$) phase control can be obtained by choosing an appropriate height (H) for the meta-atoms 10. That is, the height of the meta-atoms 10 can be chosen to achieve a phase shift difference of two-pi ($2\pi$) between light passing through a meta-atom having the smallest bottom diameter ($DB_x$) and a meta-atom having the largest bottom diameter. In this way, for some implementations, the ARC 12 material and thickness can be ideal (or closer to ideal) for all the meta-atoms, leading to improved optical performance in some implementations.

Although the illustrated example of FIG. 2 shows tapered meta-atoms 10 having a circular cross-section such that the top and bottom surfaces of each meta-atom are circular, in some implementations, each of the tapered meta-atoms has a cross-section that has a square or regular polygonal shape. Thus, for example, in some instances, each meta-atom may be formed as a right-frustum whose upper and bottom surfaces are square shaped. In any event, each meta-atom can be designed such that its top surface (i.e., the surface at the interface with the ARC) has substantially the same shape and area as the other meta-atoms. On the other hand, the area of the respective bottom surface of each meta-atom may differ from that of one or more other meta-atoms depending on the desired phase addition for each particular meta-atom. Here as well, the height of the meta-atoms can be chosen to achieve a phase shift difference between light passing through a meta-atom having the smallest bottom surface area and a meta-atom having the largest bottom surface area.

Figure 3:
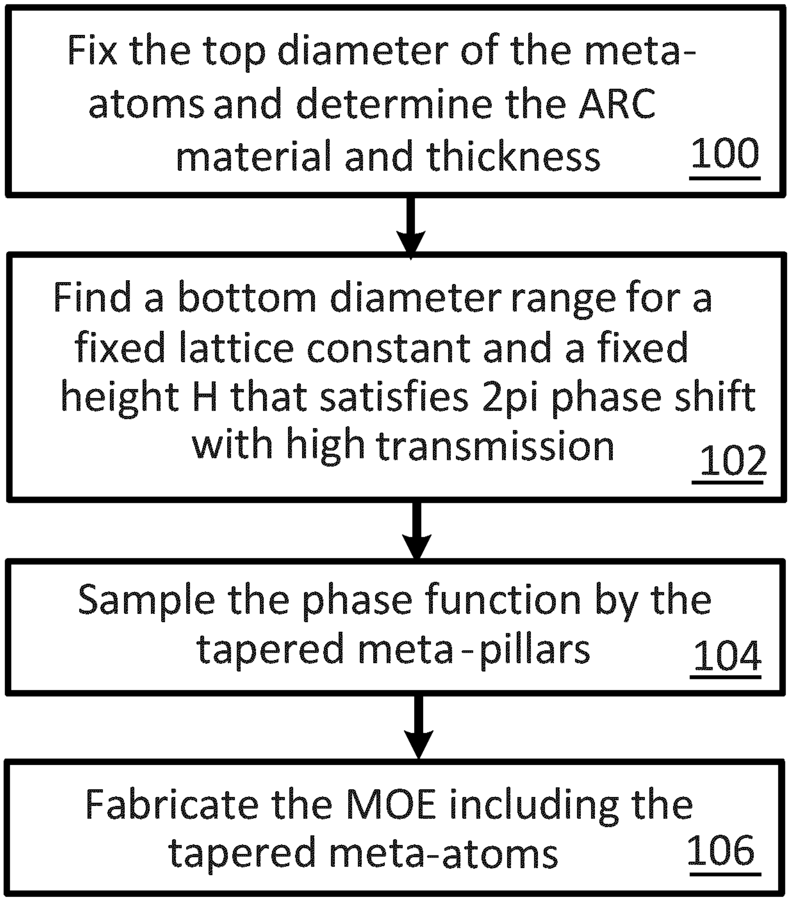
FIG. 3 is a flow chart illustrating a method of designing and fabricating a MOE having meta-atoms in accordance with the present disclosure.

FIG. 3 is a flow chart of a method of designing and fabricating a MOE having meta-atoms in accordance with the foregoing description. As indicated by 100, the top diameter (DT) of the meta-atoms 10 is established, and an ARC material and thickness are determined. In some cases, one or more computer-based simulation algorithms can be used to fix the top diameter (DT), as well as to optimize the ARC material (e.g., its refractive index) and thickness based on the top diameter. The top diameter (DT) may depend, in part, on the structure of the ARC and may be a free-design variable. In some instances, the top diameter (DT) may be chosen as the smallest cylindrical meta-atom that readily can be fabricated consistently. Thus, for example, in some implementations, the top diameter (DT) may be fixed to be in the range of 50-200 nm (e.g., 100 nm).

Figure 4A:
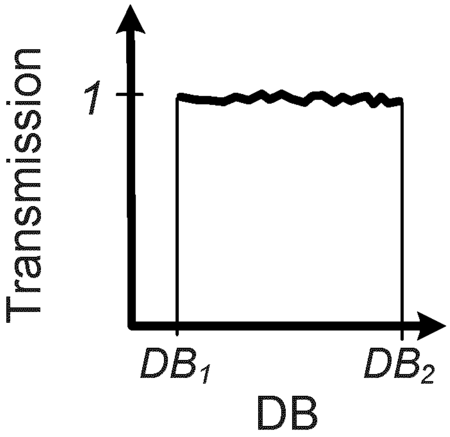
FIG. 4A illustrates an example of relatively high transmission across a range of values for differing values of bottom diameters for the meta-atoms.
Figure 4B:
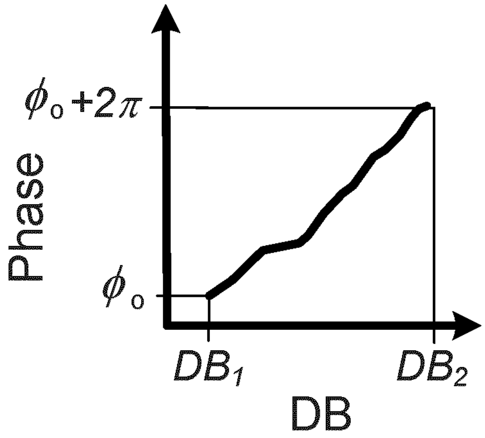
FIG. 4B illustrates an example of two-pi phase shift for different values of the bottom diameter for the meta-atoms.

Next, as indicated by 102, a bottom diameter range (DB) for meta-atoms having a fixed lattice constant and a fixed height H that satisfies 2 pi phase shift with high transmission is determined. FIG. 4A illustrates an example of relatively high transmission (e.g., close to 1) across a range of values for the bottom diameters ($DB_x$). FIG. 4B illustrates an example of 2 pi phase shift for different values of the bottom diameter ($DB_x$).

Then, as indicated by 104, the phase function by the tapered meta-atoms 10 is sampled. For example, the phase function can be discretized so as to map each location of the MOE to a respective phase. An appropriately tapered meta-atom can be associated with the corresponding location based, for example, on a phase table (e.g., a plot of phase v. bottom diameter).

As indicated by 106, an MOE including the tapered meta-atoms and an ARC then can be fabricated. In some implementations, the tapered meta-atoms can be formed using grey-scale lithography. The ARC can be deposited using known deposition techniques. For example, sputter coating can be used for a silicon nitride ARC. For situations in which the ARC is a spin-on-glass, resist can be dispensed onto the substrate, spin-coated to a specific thickness, and then cured either by baking and/or exposure to ultra-violet (UV) radiation.

Although the foregoing example refers to determining the top and bottom diameters of the meta-atoms, in some implementations an equivalent or corresponding dimension may be used instead (e.g., radius, circumference, length of a side, area).

Various aspects of the subject matter and the functional operations described in this specification (e.g., operations described in connection with FIGS. 3-7) can be implemented in digital electronic circuitry, or in computer software, firmware, or hardware. Thus, aspects of the subject matter described in this specification can be implemented, for example, as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

In some implementations, MOEs as described in this disclosures may be integrated, for example, into optical or optoelectronic systems. The MOE can be disposed, for example, either (i) to intercept a path of light emitted by an optoelectronic component (e.g., a light emitter) and to direct the light out of the module, or (ii) to intercept a path of light entering the module and to direct the light to an optoelectronic component (e.g., a light sensor).

Figure 5:
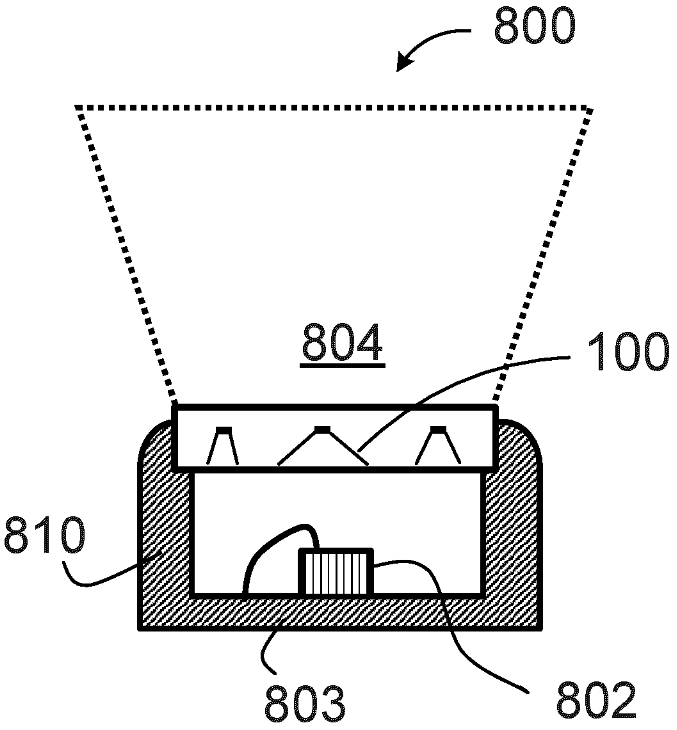
FIG. 5 illustrates an example of an optoelectronic module.

As shown in FIG. 5, a module 800 includes a substrate 803 and a light-emitting component 802 coupled to or integrated into the substrate. The light-emitting component 802 may include, for example, a laser (for example, a vertical-cavity surface-emitting laser) or a light-emitting diode. Light (e.g., infra-red or visible) generated by the light-emitting component 802 is transmitted through a housing 810 and then to an optical device 100 such as a MOE as described above. The optical device 100 is operable to interact with the light, such that modified light 804 is transmitted out of the module 800. For example, the module 800, using the optical device 100, may produce one or more of structured light, diffused light, or patterned light. The housing may include, for example, spacer(s) separating the light-emitting component 802 and/or the substrate 803 from the optical device 100.

In some implementations, the module 800 of FIG. 5 is a light-sensing module (for example, an ambient light sensor), the component 802 is a light-sensing component (for example, a photodiode, a pixel, or an image sensor), light 804 is incident on the module 800, and the light 804 is modified by the MOE 100. For example, the MOE 100 may focus patterned light onto the light-sensing component 802. In some implementations, the module 800 may including both light-emitting and light-sensing components. For example, the module 800 may emit light that interacts with an environment of the module 800 and is then received back by the module 800, allowing the module 800 to act, for example, as a proximity sensor or as a three-dimensional mapping device.

The modules described above may be integrated, for example, mobile phones, laptops, television, wearable devices, or automotive vehicles.

While this document contains many specific implementation details, these should not be construed as limitations on the scope of any inventions or of what may be claimed, but rather as descriptions of features specific to particular embodiments. Certain features that are described in this document in the context of separate embodiments can also can be implemented in combination in a single embodiment. Conversely, various features that are described in the context of a single embodiment can also can be implemented in multiple embodiments separately or in any suitable sub-combination. Various modifications can be made to the foregoing examples. Accordingly, other implementations also are within the scope of the claims.

What is claimed is:

1. An apparatus comprising:

a meta optical element including:

a substrate;

a plurality of meta-atoms on the substrate, wherein each of the meta-atoms has a respective top surface and a respective bottom surface, wherein the bottom surface forms an interface with the substrate;

an anti-reflective coating on the respective top surface of each of the meta-atoms, wherein the top surface forms an interface with the anti-reflective coating, wherein:

each of the meta-atoms has one or more tapered sides connecting the top surface of the meta-atom to the bottom surface of the meta-atom, the top and bottom surfaces of each meta-atom having a same shape as one another and having the same shape as the top and bottom surfaces of the other meta-atoms, a size of an area defined by the top surface of each particular one of the meta-atoms is the same as a size of an area defined by the top surface of each of the other meta-atoms, a size of an area defined by the bottom surface of each particular one of the meta-atoms differs from a size of an area defined by the bottom surface of other ones of the meta-atoms, and the meta-atoms have a same height as one another, wherein the height of the meta-atoms provides a phase shift difference of two-pi between light at an operating wavelength passing through a meta-atom having a smallest bottom surface area and light at the operating wavelength passing through a meta-atom having a largest bottom surface area.

2. The apparatus of claim 1 wherein each of the meta-atoms has a truncated cone shape.

3. The apparatus of claim 1 wherein each of the meta-atoms has a frustum shape.

4. The apparatus of claim 1, wherein a dimension of the top surface of each meta-atom is smaller than a corresponding dimension of the bottom surface of the same meta-atom.

5. The apparatus of claim 1, wherein the top surface of each particular meta-atom has a diameter that is smaller than a diameter of the bottom surface of the same meta-atom.

6. The apparatus of claim 5 wherein the diameter of the top surface of each meta-atom is in a range of 50-200 nm.

7. The apparatus of claim 1, wherein there are at least 1,000 meta-atoms in the plurality of meta-atoms, and wherein, collectively, the respective areas of the bottom surfaces of the meta-atoms range among at least sixteen different discrete sizes.

8. The apparatus of claim 1, comprising a meta optical element that includes the plurality of meta-atoms.

9. The apparatus of claim 8 wherein the substrate is composed of a material that is transparent to the operating wavelength.

10. The apparatus of claim 1, wherein the meta-atoms are composed of at least one of polysilicon, amorphous silicon, crystalline silicon, silicon nitride, zinc oxide, titanium oxide, aluminum zinc oxide, or a niobium oxide.

11. The apparatus of claim 1, further including:

a module including an optoelectronic component operable to emit light or sense light, wherein the meta optical element is disposed either (i) to intercept a path of light emitted by the optoelectronic component and to direct the light out of the module, or (ii) to intercept a path of light entering the module and to direct the light to the optoelectronic component.

12. An apparatus comprising:

a substrate;

a plurality of tapered meta-atoms on the substrate, wherein each of the meta-atoms has a respective top surface and a respective bottom surface, an anti-reflective coating on the respective top surface of each of the meta-atoms, wherein the top surface of each meta-atom forms a respective first interface with the anti-reflective coating, and the bottom surface of each meta-atom forms a respective second interface with the substrate, wherein:

the respective first and second interfaces for each meta-atom have a same shape as one another and have the same shape as the respective first and second interfaces for the other meta-atoms, a size of the respective first interface is the same for each of the other meta-atoms, a size of the respective second interface differs for different one of the meta-atoms, and a height of the meta-atoms provides a phase shift difference of two-pi between light at an operating wavelength passing through a meta-atom that forms a smallest second interface with the substrate and light at the operating wavelength passing through a meta-atom that forms a largest second interface with the substrate.

* * * * *